United States Patent [19]

Hicks, Jr. et al.

[11] Patent Number: 4,728,752
[45] Date of Patent: Mar. 1, 1988

[54] JOINT ASSEMBLY FOR CONNECTING BUS DUCTS HAVING UNEQUAL NUMBERS OF RUNS

[75] Inventors: Loy A. Hicks, Jr., Nazareth; Edward P. Sherwood, Allentown, both of Pa.

[73] Assignee: Eaton Corporation, Cleveland, Ohio

[21] Appl. No.: 899,313

[22] Filed: Aug. 22, 1986

[51] Int. Cl.⁴ ............................................. H02G 5/08
[52] U.S. Cl. .................. 174/88 B; 174/71 B; 174/72 B; 361/378; 439/210; 439/213
[58] Field of Search ................ 174/68 B, 70 B, 71 B, 174/72 B, 88 B; 339/22 B; 361/378; 439/210, 212, 213

[56] References Cited

U.S. PATENT DOCUMENTS

| | | | |
|---|---|---|---|
| 3,444,311 | 5/1969 | Weimer et al. | 174/68 B |
| 3,639,676 | 2/1972 | Dempsey, Jr. et al. | 174/68 B |
| 3,742,121 | 6/1973 | Schmidt | 174/72 B |
| 3,786,394 | 1/1974 | Koenig et al. | 174/88 B X |
| 3,818,417 | 6/1974 | Koenig et al. | 174/68 B X |
| 3,973,818 | 8/1976 | Souenne | 339/22 B |
| 4,627,680 | 12/1986 | Weimer et al. | 339/22 B |

Primary Examiner—Morris H. Nimmo
Attorney, Agent, or Firm—James E. Nilles; Nicholas A. Kees

[57] ABSTRACT

A reducing joint assembly which, when attached at one end thereof to a bus duct having a predetermined number of runs and at the other end thereof to a bus duct having a different number of runs, allows interconnection of these non-matching ducts without undue wasted length or materials. The reducing joint assembly includes one conventional single bolt coupler at each end thereof for each run to be connected at that respective end of the assembly. Connected between the respective single bolt couplers is a single reducer plate for each phase of the bus duct system. Each such reducer plate has tabs at each end, one for each single bolt coupler, so that the reducer plates in effect interconnect with the single bolt coupler in generally the same manner as do the bus plates of each bus duct. The apparatus also includes specialized joint covers for covering the joint thus created to prevent the entry of foreign objects.

12 Claims, 10 Drawing Figures

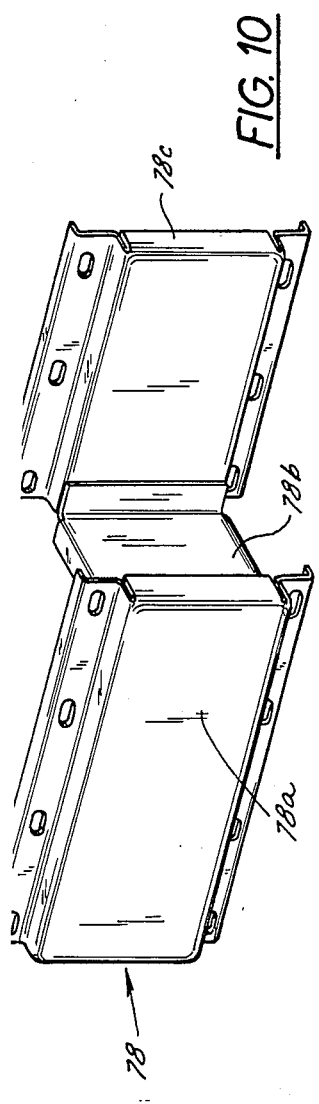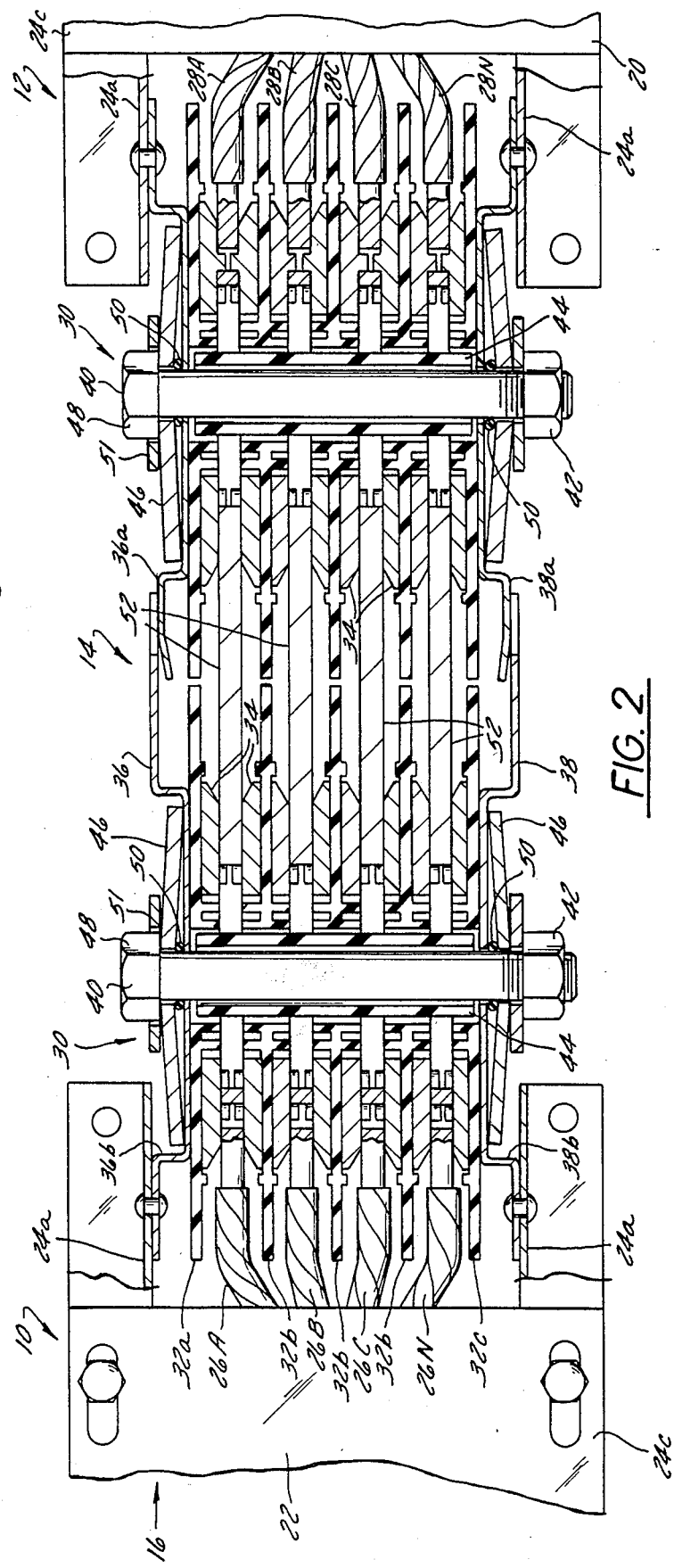

JOINT ASSEMBLY FOR CONNECTING BUS DUCTS HAVING UNEQUAL NUMBERS OF RUNS

BACKGROUND OF THE INVENTION

This invention relates to electric busway assemblies and in particular to joint assemblies for facilitating the connection of a bus duct having one or more runs to a bus duct having a different number of runs.

Electrical busway systems are used for distribution of electrical power, especially for power systems having high current ratings. These systems normally employ elongated duct-type housings which enclose a plurality of parallel bus bars, the assemblies being termed bus ducts. The ducts are manufactured in sections of predetermined length for convenience of transportation, handling and installation. Generally these sections are mounted end to end with the bus bars of connecting sections in electrically conductive contact with each other via a joint assembly. An exemplary general arrangement for such a joint assembly is shown in U.S. Pat. No. 3,786,394, now assigned to the assignee of the present invention.

Systems to be applied in particularly high current applications often employ multiple parallel bus duct runs. This is generally done when the current carrying capabilities of individual bus bars would be exceeded by the expected or rated current load. An assembly for connecting the bus bars in the same phase of the various runs of a multiple run bus duct so as to prevent localized overcurrent conditions, referred to hereinafter as a "phase collector", is disclosed in U.S. Pat. No. 3,818,417, now assigned to the assignee of the present invention. Thus, in an application where the total expected or rated current in each individual phase is greater than a single bus bar is capable of carrying, more than one bus bar is supplied per phase, and phase collectors are provided to balance the phase among the bus bars carrying each individual phase.

Frequently the need arises to connect a bus duct having a certain number of runs to a bus duct having a different number of runs. This need arises most commonly in an application where it is desired to reduce the bus duct current rating, such as for short distance power tap-offs. For example a triple run duct may be connected to a double run duct, or a double run duct to a single run duct, or a triple run duct to a single run duct, or any other such arrangement. In the past, this connection was accomplished by use of an unfused reducing section, the length of which was simply that of one of the shorter regular sections. The reducing section was assembled with sufficient runs to match the duct having the larger number of runs, and connected to the load end of the section with the larger number of runs by the same means used to connect identical sections. One or more of the runs of the unfused reducing section was simply terminated, with phase collectors connecting the bus bars within each phase as referred to above. The end of the reducing section connected to the source end of the duct having the lower number of runs was then also connected by the usual means, being configured to match that duct. Such an unfused reducing section has certain disadvantages, however, relating particularly to all the extra parts required, including but not limited to extra plug-in joints, extra phase collectors and insulators, and the extra sheet metal and labor required.

This invention relates to improvements to the apparatus described above and to solutions to the problems raised thereby.

SUMMARY OF THE INVENTION

According to the invention, a reducing joint is provided which, when attached at one end thereof to a bus duct having a predetermined number of runs and at the other end thereof to a bus duct having a different number of runs, allows interconnection of these non-matching ducts without undue wasted length or materials. The reducing joint includes one conventional single bolt coupling means at each end thereof for each run which is to be connected at that respective end of the reducing joint. That is, for example, the reducing joint includes three single bolt coupling means at one end for connecting to the load end of a bus duct having three runs, and one single bolt coupling means at the opposite end for connecting to the source end of a bus duct having one run. Connected between the respective single bolt coupling means is a single reducer plate for each phase of the bus duct system. Each such reducer plate has tabs at each end, one for each single bolt coupling means, so that the reducer plates in effect interconnect with the single bolt coupling means in generally the same manner as would the bus bars of each bus duct. The invention also provides for specialized joint cover means for covering the unique joint thus created to prevent the entry of dust and other foreign objects.

It is thus an object of the invention to provide a reducing joint for the connection of bus ducts, the current ratings of which are non-matching, which reducing joint is more space- and cost-efficient than previous reducing joints.

A more specific object of the invention is to provide a reducing joint as described above including a separate single bolt coupling means for each run which is to be connected to the reducing joint and one reducer plate for each phase of the bus duct system connected between the single bolt coupling means for the two sides.

Another specific object of the invention is to provide a reducing joint as described above wherein the reducer plate includes tabs at each end thereof, one for each single bolt coupling means.

Other objects and advantages of the invention will become apparent hereinafter.

DESCRIPTION OF THE DRAWINGS

FIG. 2 is a cross-sectional view of the assembly shown in FIG. 1, taken generally along line 2—2;

FIG. 10 is an isometric view of a side cover employed in the embodiment shown in FIG. 6.

DESCRIPTION OF THE PREFERRED EMBODIMENTS

As used in this description and in the claims which follow, the term "phase" shall be taken to include all conductors in different runs of any particular bus duct which carry the same phase, and including those conductors which are used to carry any neutral or ground phase. Further, it should be understood that the various conductors in the same phase located in different runs will generally be connected by phase collectors so as to avoid localized overcurrent conditions, although the phase collectors are not shown or described for simplicity.

Figure 1:
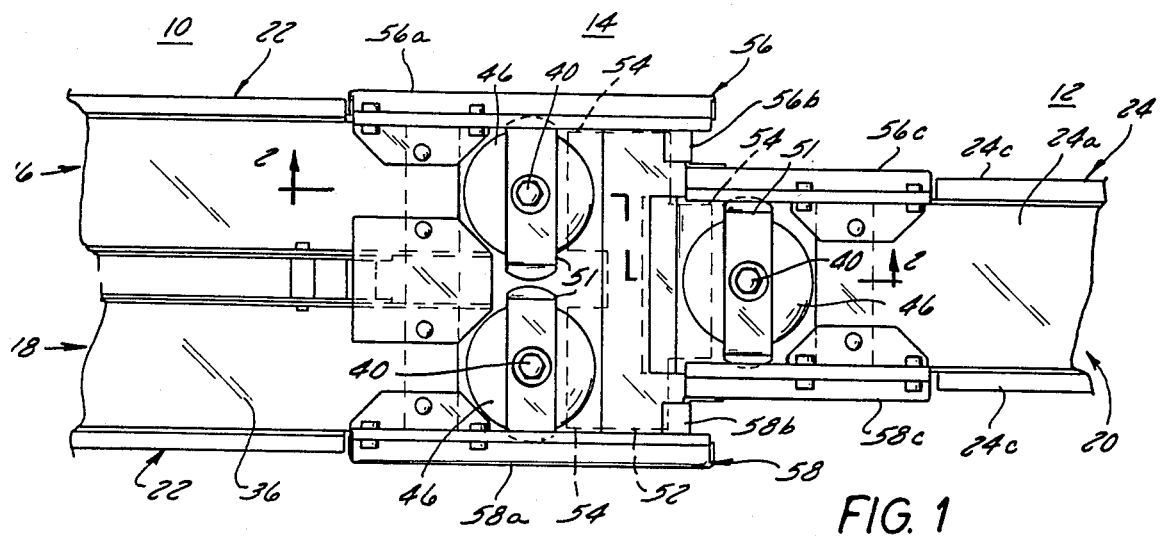
FIG. 1 is a top view of a reducing joint assembly constructed according to the invention, connecting the load end of a double run bus duct to the source end of a single run bus duct.
Figure 3:
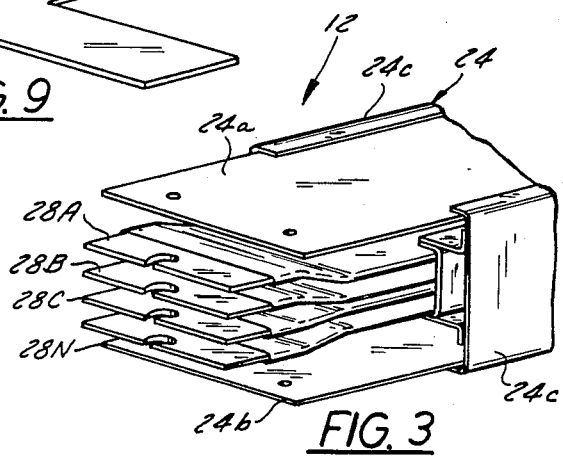
FIG. 3 is an isometric view of the end of a conventional feeder-type bus duct to be attached to the joint assembly as shown in FIGS. 1 and 2.

Referring now to FIGS. 1 and 2, two duct sections 10 and 12 are electrically connected together end to end by means of a joint assembly 14. As can be seen in FIG. 1, first duct section 10 has two runs 16 and 18, while second duct section 12 has one run 20. Joint assembly 14 is thus a reducing joint assembly which connects the load end of first duct section 10 to the source end of second duct section 12. As can be seen best in FIG. 2, first duct section 10 includes an elongated housing 22 which further includes a plurality of runs of flat elongated bus bars 26A, 26B, 26C and 26N, each part of a distinct phase. Similarly, second duct section 12 includes a housing 24 which further includes a single run of a plurality of flat elongated bus bars 28A, 28B, 28C and 28N. The invention makes no provision for changing in any way the number of phases of the circuit, or for adding or eliminating any neutral or ground phases. a conventional manner of arranging the bus bars within the housing is disclosed in U.S. Pat. No. 3,639,676, now assigned to the assignee of the present invention. One preferred arrangement for a feeder-type bus duct is illustrated in isometric in FIG. 3. As shown there, each housing 24 includes a top cover 24a and a bottom cover 24b held in place by a pair of identical sides 24c. As also shown there, sides 24c also generally provide support for the bus bars. Housing 22 may be identical to housing 24.

Figure 4:
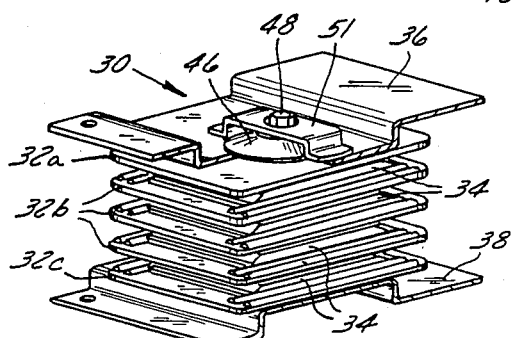
FIG. 4 is an isometric view of the stack of a generally conventional single bolt coupler as employed in FIGS. 1 and 2.

As can be seen by comparing FIG. 1 to FIG. 2, the reducing joint assembly 14 includes a single bolt coupler 30, shown in isometric in FIG. 4, for each run connected to the reducing joint assembly 14. Thus in the embodiment shown, the reducing joint assembly 14 is connected to the two runs 16 and 18 of the first duct section 10 and the one run 20 of the second run 12, and each such connection is made by means of a single bolt coupler 30.

The preferable structure of the single bolt coupler 30 is disclosed in U.S. Pat. No. 3,786,394, now assigned to the assignee of the present invention. As shown in FIG. 2, each such single bolt coupler 30 includes a plurality of adjacent facing pairs of conductive splice plates 34, a plurality of insulator plates 32a, 32b and 32c arranged in stacked relationship with individual ones being positioned adjacent the opposite outer sides of each pair of splice plates 34, a top end plate 36 and a bottom end plate 38, all arranged in stacking relationship. The insulator plates 32a, 32b and 32c, the splice plates 34 and the end plates 36 and 38 are all preferably generally rectangular in shape. The stack thus formed, as shown in FIG. 4, is held together by a bolt 40 inserted generally perpendicularly through central openings in all of the plates and a nut 42 threaded to the end of the bolt 40, referring again to FIG. 2. The bolt 40 is surrounded by an insulative sleeve 44 fitted inside the above mentioned central opening in each of the plates, and particularly inside closely fitted openings in the insulator plates 32a, 32b and 32c. Spring washers 46, such as those most commonly sold under the tradename "Bellville washers", are located beneath the head 48 of bolt 40 and beneath the nut 42. An O-ring 50 may be placed between each Bellville washer 46 and the respective end plate 36 or 38 to prevent moisture from entering the assembly. As shown in FIGS. 1 and 4, to facilitate assembly, a bracket 51 may be provided, attached to top end plate 36, such as by welding, for capturing the head 48 of the bolt 40 so that the connection is tightened and loosened by simply turning the nut 42.

Figure 5:
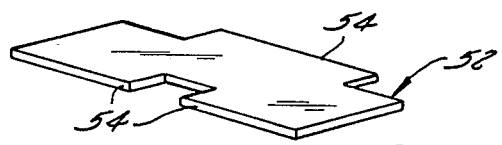
FIG. 5 is an isometric view of a reducer plate employed in the embodiment shown in FIG. 1.

Thus to install each single bolt coupler 30 to the end of each run of each respective bus duct 10 and 12, the ends of each bus bar are inserted between facing ends of corresponding adjacent pairs of splice plates 34. Each reducing joint 14 is provided with a plurality of reducer plates 52, one for each phase. One such reducer plate 52 is shown in isometric in FIG. 5. As can be seen in that figure, the reducer plate 52 is provided with a plurality of tabs 54. In any of the embodiments disclosed herein, the reducer plate must be provided with one such tab for each bus duct run which is to be connected to the reducing joint 14. Thus reducer plate 52 has two such tabs 54 at one edge and one such tab 54 at the other because the reducing joint 14 is to be connected to the two runs 16 and 18 of the first bus duct 10 and the one run 20 of the second bus duct 12. Each such tab 54 is then inserted into the respective single bolt coupler 30 between facing ends of corresponding adjacent pairs of splice plates 34. Each of the nuts 42 is then tightened on bolts 40, thereby compressing the stacks and clamping the splice plates 34 into electrically conductive engagement with the bus bars and the reducer plates. An electrical connection is thus provided from the respective bus bars of each phase of the first bus duct 10, through the respective reducer plate 52, and to the respective bus bars in the corresponding phase of the second bus duct 12.

After assembly of the bus ducts 10 and 12 and reducing joint 14, side covers 56 and 58 are attached to the sides of the duct assemblies for covering the sides of the joint to prevent the entry of dust and other foreign objects. Each side cover 56 and 58 includes a first longitudinal section 56a and 58a, a transverse section 56b and 58b, and a second longitudinal section 56c and 58c, all permanently connected together, such as by welding. Each first longitudinal section 56a and 58a is connected lengthwise to a respective side of the first bus duct 10. Correspondingly each second longitudinal section 56c and 58c is connected lengthwise to a respective side of the second bus duct 12. In the case of each side cover 56 and 58 the two longitudinal sections are connected to each other by the respective transverse section 56b and 58b. The length of each of the respective longitudinal sections is generally the same regardless of the configuration. That is, each first longitudinal section 56a and 58a is of sufficient length to reach from the end of the housing 22 of the first bus duct 10 to the opposite edge of the reducer plates 52. Each second longitudinal section 56c and 58c is of sufficient length to reach from the end of the housing 24 of the second bus duct 12 to the proximal edge of the reducer plates 52. The length of each of the transverse sections 56b and 58b, however, is determined based on the difference between the width of the first bus duct 10 and the second bus duct 12, as will be referred to again below with respect to alternative embodiments of the invention. It can be seen by reference to FIG. 1 that the transverse sections 56b and 58b are relatively short in a reducing joint assembly 14 which connects a double run bus duct 10 to a single run bus duct 12 where each run has about the same current rating.

To facilitate assembling the reducing joint assembly 14 on-site, the top end plate 36 and the bottom end plate 38 of the respective single bolt couplings 30 are preferably constructed and shaped so as to fit together as shown in FIG. 2. In the particular embodiment shown there, the end plates 36a and 38a of the stack attached to the second bus duct 12 are bent inward so as to fit snugly between the end plates 36b and 38b of the stacks attached to the first bus duct 10. Other arrangements for snug attachment may also be employed.

Figure 7:
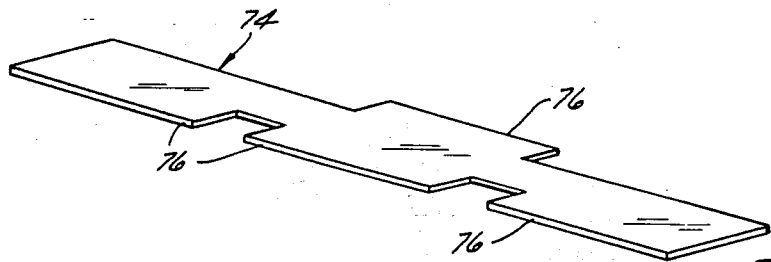
FIG. 7 is an isometric view of a reducer plate employed in the embodiment shown in FIG. 6.
Figure 6:
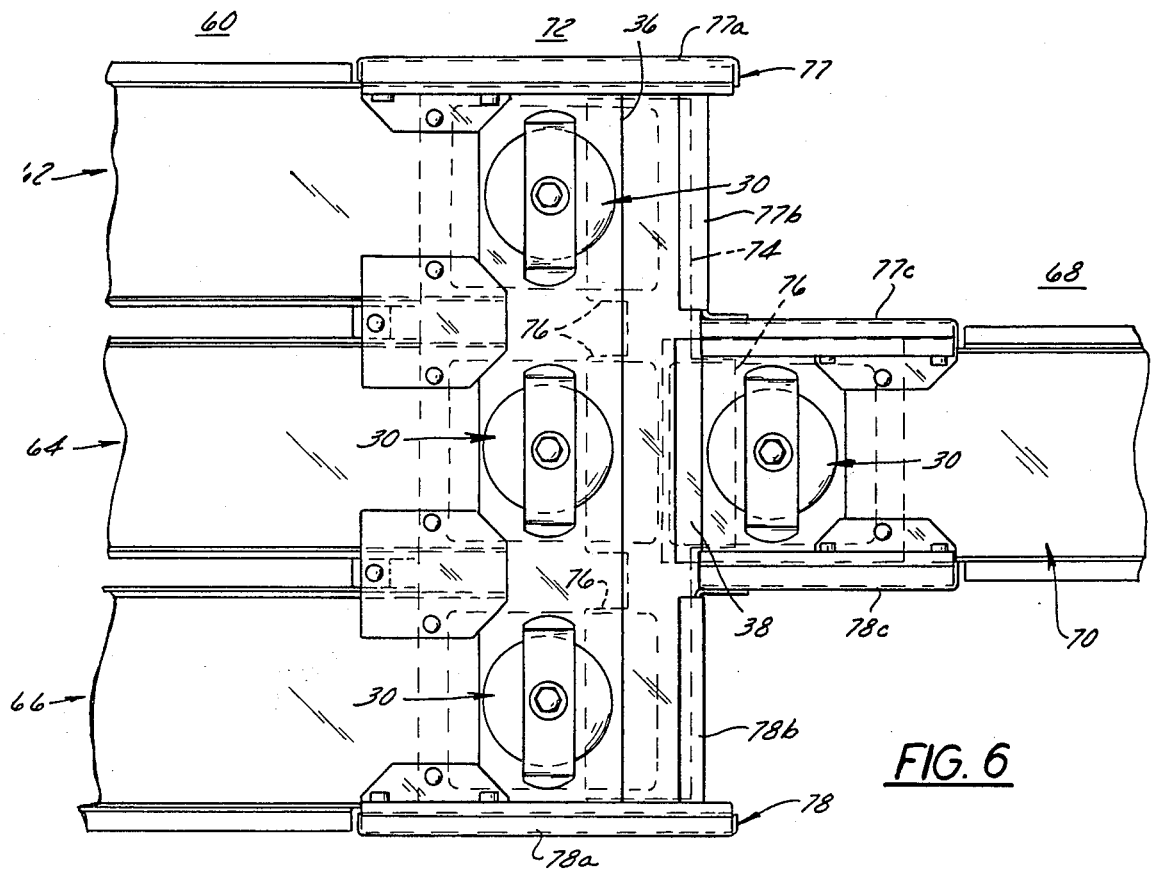
FIG. 6 is a top view of a reducing joint assembly constructed according to an alternative embodiment of the invention, connecting the load end of a triple run bus duct to the source end of a single run bus duct.

FIGS. 6 and 7 show an alternative embodiment of the invention. This embodiment connects the load end of a bus duct 60 having three runs 62, 64 and 66 to the source end of a bus duct 68 having only one run 70. As can be seen in these figures, a reducing joint assembly 72 for connecting these two bus ducts 60 and 68 again includes a single bolt coupler 30 for each run of each duct to be attached to the reducing joint assembly. Once again the various conductors in the same phase located in different runs will generally be connected by phase collectors (not shown) so as to avoid localized overcurrent conditions. Inserted between the three single bolt couplers 30 attached to the load end of bus duct 60 and the one single bolt coupler 30 attached to the source end of bus duct 68 are a plurality of reducer plates 74, one for each of the phases in bus ducts 60 and 68. One of the reducer plates 74 is shown in isometric in FIG. 7. Each reducer plate 74 includes one tab 76 at the edge facing the single run bus duct 68 and three tabs 76 at the edge facing the triple run bus duct 60. Hence, as with the embodiment described above, one tab of the reducer plate is provided for insertion into each single bolt coupler 30. A closed electrical path is thus provided from the respective bus bars of each phase of the triple run bus duct 60, through the respective reducer plate 74, and to the respective bus bars in the corresponding phase of the single run bus duct 68.

Side covers 77 and 78 are again attached to the sides of the duct assemblies for covering the sides of the joint to prevent the entry of dust and other foreign objects, similar to the side covers 56 and 58 as described in reference to FIG. 1. Notice, however, that as shown in FIG. 6 the transverse sections 77b and 78b are longer to accommodate the increased difference in width between the busses 60 and 68, while the longitudinal sections 77a, 78a, 77c and 78c are the same length as the corresponding sections of side covers 56 and 58 shown in FIG. 1. Side cover 78 is also shown in isometric in FIG. 10.

Figure 9:
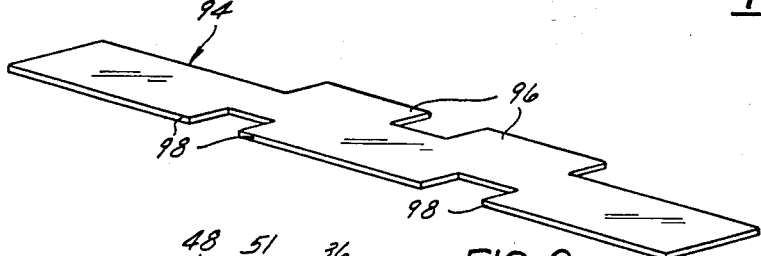
FIG. 9 is an isometric view of a reducer plate employed in the embodiment shown in FIG. 8.
Figure 8:
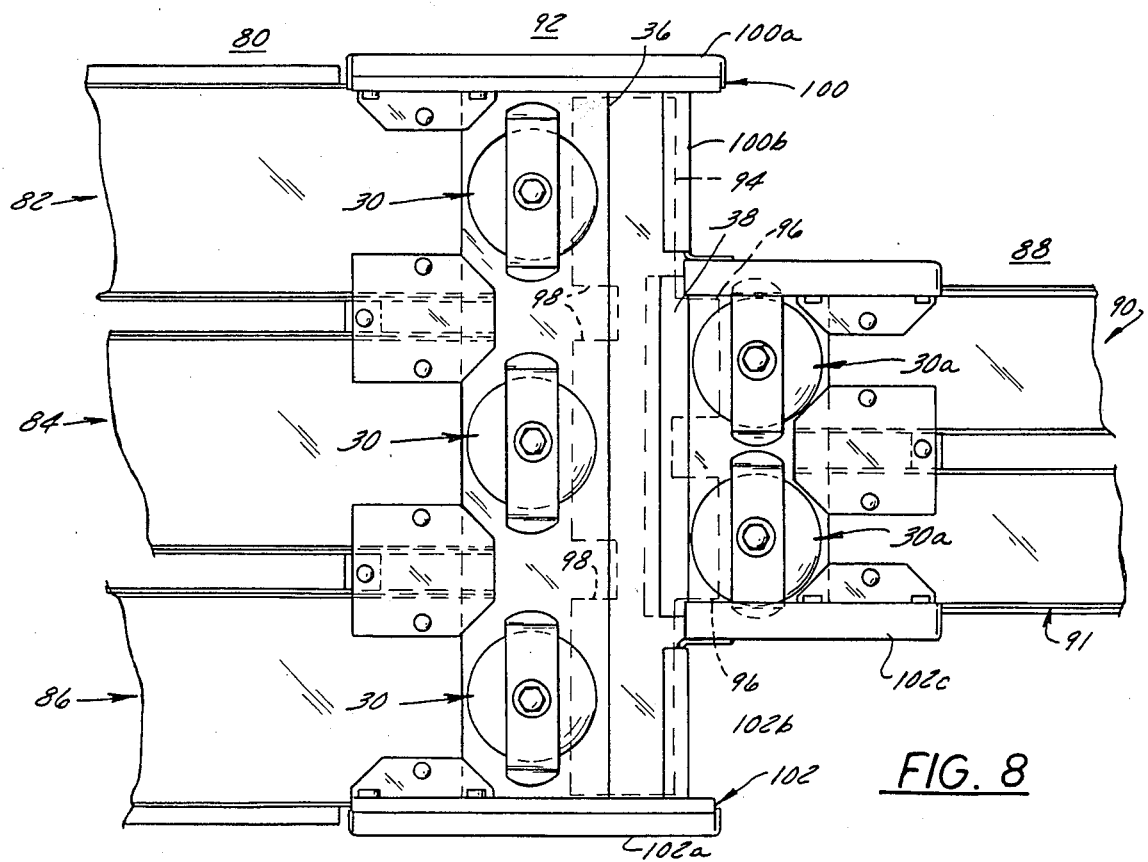
FIG. 8 is a top view of a reducing joint assembly constructed according to another alternative embodiment of the invention, connecting the load end of a large frame triple run bus duct to the source end of a small frame double run bus duct.

Another alternative embodiment of the invention is shown in FIGS. 8 and 9. This embodiment connects the load end of a large frame bus duct 80 having three runs 82, 84 and 86 to the source end of a small frame bus duct 88 having two runs 90 and 91. As can be seen in these figures, it is not necessary that the runs of the first bus duct match the runs of the second duct in size. The runs of the triple run bus duct 80 are wider, having a higher current rating per run besides having a higher current rating overall, while the runs of the double run 88 are narrower, having a lower current rating per run besides having a lower current rating overall. A reducing joint assembly 92 for connecting these two bus ducts 80 and 88 again includes a single bolt coupler 30 for each run of each duct to be attached to the reducing joint assembly. Two single bolt couplers 30a have a relatively smaller plate width and are attached to the source end of small frame bus duct 88. A plurality of reducer plates 94 are inserted between three single bolt couplers 30 attached to the load end of large frame bus duct 80 and the couplers 30a. One such coupler is provided for each of the phases in bus ducts 80 and 88. One of the reducer plates 94 is shown in isometric in FIG. 9. Each reducer plate 94 includes two tabs 96 at the edge facing the double run bus duct 88 and three tabs 98, which are a different size than tabs 96, at the edge facing the triple run bus duct 80. The respective tabs 96 and 98 are sized to match the particular runs to which the respective edge of the reducer plate faces. Thus, as referred to above, even the current capacity of the runs of the two bus ducts to be connected by use of this invention need not be matched. As with the other embodiments, then, one tab of the reducer plate is provided for insertion into each single bolt coupler 30 and 30a so that a closed electrical path is provided from the respective bus bars of each phase of the triple run bus duct 80, through the respective reducer plate 94, and to the respective bus bars of the corresponding phase of the single run bus duct 68. Similar to the first two embodiments described above, side covers 100 and 102 are provided for covering the sides of the joint to prevent the entry of dust and other foreign objects, similar to the side covers 56, 58, 77 and 78 described in reference to earlier drawing figures. Notice again that, as shown in FIG. 8, the transverse sections 100b and 102b are longer than sections 56b and 58b to accommodate the increased difference in width between the busses 80 and 88, while the longitudinal sections 100a, 102i a, 100c and 102c are the same length as the corresponding sections of side covers 56 and 58 shown in FIG. 1.

While the apparatus hereinbefore described is effectively adapted to fulfill the aforesaid objects, it is to be understood that the invention is not intended to be limited to the particular preferred embodiments of joint assembly for connecting bus ducts having unequal numbers of runs herein set forth. Rather, it is to be taken as including all reasonable equivalents without departing from the scope of the appended claims.

We claim:

1. In combination, a first bus duct including a plurality of phases each being carried by a plurality of bus bars located in a plurality of runs, a second bus duct having fewer runs than said first bus duct and the same number of phases as said first bus duct, and a joint assembly connected between said bus ducts and electrically connecting said phases of said first bus duct to corresponding phases of said second bus duct, said joint assembly comprising:

a plurality of bolt assemblies, one for each run of each of said bus ducts, attached at the end of one of said bus ducts and facing the other of said bus ducts, and a plurality of reducer plates, one for each phase, each of said reducer plates having a plurality of tabs thereon, the number of tabs corresponding to the number of bolt assemblies;

each of said bolt assemblies comprising:

a plurality of adjacent pairs of generally flat, elongated splice plates having a central opening and arranged in stacked relationship, the end portion of the individual corresponding bus bar of the respective duct and a tab of one of said reducing plates being positioned between respective pairs of said splice plates;

a plurality of generally flat, elongated insulator plates also having a central opening and arranged in stacked relationship with individual insulator plates being positioned adjacent the opposite outer sides of each pair of said splice plates;

threaded fastener means extending through said central openings, said threaded fastener means when tightened urging said pair of splice plates into contact pressure with the corresponding bus bars and reducing plate tabs to establish electrical connection from the phases of said first bus duct, through said reducer plates to the phases of said second bus duct; and insulator sleeve means closely fitting inside said central openings and located between said threaded fastener means and said splice plates.

2. A combination as recited in claim 1 further comprising side cover means attached to the sides of said ducts and joint assemblies for covering the sides of said joint assemblies to prevent the entry of foreign objects into said joint assemblies.

3. A combination as recited in claim 2 wherein said tabs of each of said reducer plates are located at each edge of said reducing plate facing a respective duct, the number and width of said tabs corresponding to the number and width of said runs of said respective facing duct.

4. A combination as recited in claim 3 wherein said first bus duct includes two runs, said second bus duct includes one run, and said reducer plates each have two tabs in the edge thereof facing said first bus duct and one tab in the edge thereof facing said second bus duct.

5. A combination as recited in claim 3 wherein said first bus duct includes three runs, said second bus duct includes one run, and said reducer plates each have three tabs in the edge thereof facing said first bus duct and one tab in the edge thereof facing said second bus duct.

6. A combination as recited in claim 3 wherein said first bus duct includes three runs, said second bus duct includes two runs, and said reducer plates each have three tabs in the edge thereof facing said first bus duct and two tabs in the edge thereof facing said second bus duct.

7. In combination, a first bus duct including a plurality of phases each being carried by a plurality of bus bars located in a plurality of runs, a second bus duct having fewer runs than said first bus duct and the same number of phases as said first bus duct, and a joint assembly connected between said bus ducts and electrically connecting said phases of said first bus duct to corresponding phases of said second bus duct, said joint assembly comprising:

a plurality of bolt assemblies, one for each run of each of said bus ducts, attached at the end of one of said bus ducts and facing the other of said bus ducts, and a plurality of reducer plates, one for each phase, each of said reducer plates having a plurality of tabs thereon, the number of tabs corresponding to the number of bolt assemblies;

each of said bolt assemblies comprising:

a plurality of splice means, each having a central opening and arranged in stacked relationship, the end portion of the individual corresponding bus bar of the respective duct and a tab of one of said reducing plates being secured in conducting contact with a respective one of said splice means;

a plurality of generally flat, elongated insulator plates also having a central opening and arranged in stacked relationship with individual insulator plates being positioned between adjacent phases within said bolt assembly;

threaded fastener means extending through said central openings, said threaded fastener means when tightened urging said splice means into contact pressure with the corresponding bus bars and reducing plate tabs to establish electrical connection from the phases of said first bus duct, through said reducer plates to the phases of said second bus duct; and insulator sleeve means closely fitting inside said central openings and located between said threaded fastener means and said splice means.

8. A combination as recited in claim 7 further comprising side cover means attached to the sides of said ducts and joint assemblies for covering the sides of said joint assemblies to prevent the entry of foreign objects into said joint assemblies.

9. A combination as recited in claim 8 wherein said tabs of each of said reducer plates are located at each edge of said reducing plate facing a respective duct, the number and width of said tabs corresponding to the number and width of said runs of said respective facing duct.

10. A combination as recited in claim 9 wherein said first bus duct includes two runs, said second bus duct includes one run, and said reducer plates each have two tabs in the edge thereof facing said first bus duct and one tab in the edge thereof facing said second bus duct.

11. A combination as recited in claim 9 wherein said first bus duct includes three runs, said second bus duct includes one run, and said second reducer plates each have three tabs in the edge thereof facing said first bus duct and one tab in the edge thereof facing said second bus duct.

12. A combination as recited in claim 9 wherein said first bus duct includes three runs, said second bus duct includes two runs, and said reducer plates each have three tabs in the edge thereof facing said first bus duct and two tabs in the edge thereof facing said second bus duct.

* * * * *

UNITED STATES PATENT AND TRADEMARK OFFICE
CERTIFICATE OF CORRECTION

PATENT NO. : 4,728,752
DATED : March 1, 1988
INVENTOR(S) : Loy A. Hicks and
Edward P. Sherwood It is certified that error appears in the above-identified patent and that said Letters Patent are hereby corrected as shown below:

On the Title Page

At Line [21] Appl. No.: 899,31*9*

Signed and Sealed this

Twelfth Day of July, 1988

*Attest:*

DONALD J. QUIGG

*Attesting Officer*  Commissioner of Patents and Trademarks